United States Patent [19]

Nolan

[11] Patent Number: 4,776,217
[45] Date of Patent: Oct. 11, 1988

[54] COUPLING FOR VIBRATION TESTING

[75] Inventor: Douglas C. Nolan, Syracuse, N.Y.

[73] Assignee: Mechanical Technology Incoporated, Latham, N.Y.

[21] Appl. No.: 145,128

[22] Filed: Jan. 19, 1988

[51] Int. Cl.$^4$ ............................................... B06B 1/10
[52] U.S. Cl. ....................................... 73/663; 403/224; 384/125
[58] Field of Search ................. 73/662, 663, 664, 665, 73/666, 667, 668; 403/224, 225, 227; 384/125

[56] References Cited

PUBLICATIONS

Team Corporation, Hydrostatic Bearings Vibration Test Equipment, 1973.

Primary Examiner—Michael J. Tokar
Assistant Examiner—Lawrence G. Fess
Attorney, Agent, or Firm—Joseph V. Claeys

[57] ABSTRACT

A coupling for vibration testing comprises a pair of connecting links to be attached to a shaker head and to a driven fixture, respectively. Each of these has an axial passage through it and a convex spherical distal bearing surface. These bearing surfaces face each other. A center element has an axial passage through it and has opposite concave spherical bearing surfaces that face against the convex spherical bearing surfaces of the two connecting links. A low-friction coating or layer, i.e., fiber-reinforced PTFE, is applied to the convex bearing surfaces of the connecting links and provides a low-friction sliding surface against the mating surfaces of the center element. A preload bolt extends through the axial passages of the device and exerts a compressive axial preloading stress which exceeds the maximum vibrational force likely to be encountered.

7 Claims, 1 Drawing Sheet

COUPLING FOR VIBRATION TESTING

BACKGROUND OF THE INVENTION

The present invention relates to vibration testing systems, i.e. equipment for evaluating resistance to shock and vibration failure of test articles such as electronic or mechanical devices. The present invention is more specifically directed to an improved coupling for vibration testing.

In the vibration testing of equipment, a test system generally comprises a vibration source or shaker head, a fixture or mounting to which the test article is attached, and a connecting device or coupling which transmits the vibration or shaking from the shaker head to the fixture. Typically, one end of the coupling is bolted to the shaker head, and the other end is bolted to the fixture. Then, the test article is bolted or strapped to the fixture.

For effective transmission of the vibrational motion and forces associated with it from the shaker head to the test article, the coupling device must be quite stiff in the axial direction, i.e. in the direction between the shaker head and the fixture. The stiffness that is required depends on the vibration frequency, the latter being generally 1 Hertz to 2,000 Hertz. For higher frequencies, i.e., frequencies above 100 Hertz, the coupling generally requires a rather massive section to obtain the needed stiffness.

For higher frequency vibration testing, the displacement amplitude is generally quite small, usually on the order of a few thousandths of an inch. Displacement amplitude can be in the microinch range for extremely high frequency vibration testing. Therefore, the coupling for vibration testing must have a lash or axial play that is small with respect to the displacement involved, approaching zero lash for high frequency testing.

For many vibration testing applications, at least some angular and/or translational misalignment capability is needed for protecting the shaker head from side-loading forces. These side-loading forces can develop if there is any travel of the test fixture along an axis which is out of true parallel alignment with the natural path of motion of the constrained shaker head. Bending forces can also be introduced if the test fixture develops an angular orientation relative to the shaker head. Therefore, the coupling must permit some angular misalignment and must have an offset or translational misalignment capability where the tested article is subjected to other than strictly linear vibratory motion.

A coupling which can accommodate angular and translational offset is highly desirable for linear motion applications as well, as it can avoid the need for time-consuming, and therefore expensive, precision alignment. Precision alignment can be required in all but the shortest-stroke linear vibration, where a displacement of more than a few thousandths of an inch can damage or destroy the shaker head. Precision alignment is generally not economically feasible where the shaker head must frequently be repositioned for different test configurations.

A coupling for vibration testing ideally should have the following characteristics: (a) adequate stiffness for the frequency range of interest; (b) lash compatible with the displacement range of interest; (c) adequate misalignment tolerance; (d) compact size and light weight; (e) transportability and repositionability; (f) low initial cost; (g) low maintenance; (h) low operation cost; and (i) ease of reconfiguration for various applications.

There are three basic connector schemes currently employed for connecting a shaker head to a test fixture: rigid couplings, mechanical couplings with misalignment capability, and spherical hydrostatic bearings.

Rigid couplings have no misalignment tolerance, and are therefore not useful for testing articles that must undergo any rotation. Further, with rigid couplings, alignment is costly and time consuming.

Mechanical couplings may be designed to permit offset or misalignment capability. This type of coupling generally has a significant lash, or develops lash after only relatively short periods of operation. These therefore are not of great use for any testing except low-frequency, long-stroke vibration testing.

Spherical hydrostatic bearings are frequently employed, and are currently considered the only feasible approach for high-frequency testing where alignment capability is a significant consideration. The principal benefit of spherical hydrostatic bearing is its high axial stiffness characteristic, which results from the thinness of the oil-film separating the mating moving surfaces. These bearings also have very low friction between the spherical bearing surfaces, and have a substantially zero lash due to the preloading of a preload bolt.

Spherical hydrostatic bearings have been employed for a number of years, are well known in the art, and need not be described in detail.

These hydrostatic bearing devices do have a number of significant drawbacks. Because of the small oil-film thickness (0.5–1.0 mils) the spherical bearing surfaces have extremely narrow machining tolerances. In order to ensure that there is a film of oil at all times during the testing procedure, these bearings have complicated oil passages, oil pockets, and sealing grooves machined into them, and must be connected with oil pressure feed lines. This not only increases the expense and complexity of the devices, but also reduces their transportability and increases their weight. In addition, because the oil-film can sustain only a relatively small pressure loading, the spherical bearing surfaces must have a relatively large area. This necessitates a rather large diameter for many test applications.

OBJECTS AND SUMMARY OF THE INVENTION

Accordingly, it is an object of this invention to provide a coupling for vibration testing which avoids the drawbacks of the prior art.

It is a more specific object of this invention to provide a bearing with provides stiffness and backlash characteristics equivalent to those of rigid or hydrostatic spherical couplings, and alignment capabilities equivalent to hydrostatic couplings, but without the problems associated with hydrostatic or oil-film bearings.

It is another object of this invention to provide a spherical low-friction-bearing-type coupling which is rather compact, and lightweight, and requires less machine tolerance and fewer parts than corresponding hydrostatic couplings.

In accordance with an aspect of this invention, a coupling for vibration testing comprises a first connecting link to be attached to the shaking device or shaker head and a second connecting link to be attached to a driven device, such as the testing fixture. These connecting links each have an axial passage and each have a convex spherical distal bearing surface, the bearing surfaces being oriented towards one another. A center element has an axial passage through it and also has opposite concave spherical bearing surfaces that face against the convex spherical bearing surfaces of the first and second connecting links. Low friction elements are disposed between each of the convex spherical bearing surfaces and the associated bearing surfaces of the center element to permit relative sliding. A preload bolt extends within the axial passages and exerts a compressive axial preloading stress on the connecting links and on the center elements. The low friction elements can include layers of a low friction material that has a high shear strength, and for this purpose, a fiber-reinforced Teflon (PTFE) is preferred. A PTFE fabric layer surface generally permits a low machine tolerance (i.e. 0.010–0.020 inches) which means that the spherical mating surfaces will be less sensitive to machining variations than corresponding spherical surfaces on hydrostatic spherical couplings. The PTFE fabric has a high shear strength, and thus is considered long life and permanent. The PTFE fiber composite layer can accept pressure loadings many times higher than the hydrostatic oil layer in prior art couplings, thus permitting a much more compact design than is possible in the prior art. The bearings or couplings of this invention not only have a lower initial cost, but also require lower maintenance activity than hydrostatic spherical coupling, and have lower operating costs, as there is no need for high-pressure oil source. Because of the lighter weight and lack of connecting hoses, the couplings of this invention are significantly less expensive to reconfigure for various custom applications.

The above and many other objects, features, and advantages of this invention will be more fully understood from the ensuing description of a preferred embodiment, which should be considered in connection with the accompanying drawing.

DETAILED DESCRIPTION OF THE PREFERRED EMBODIMENTS

Figure 1:
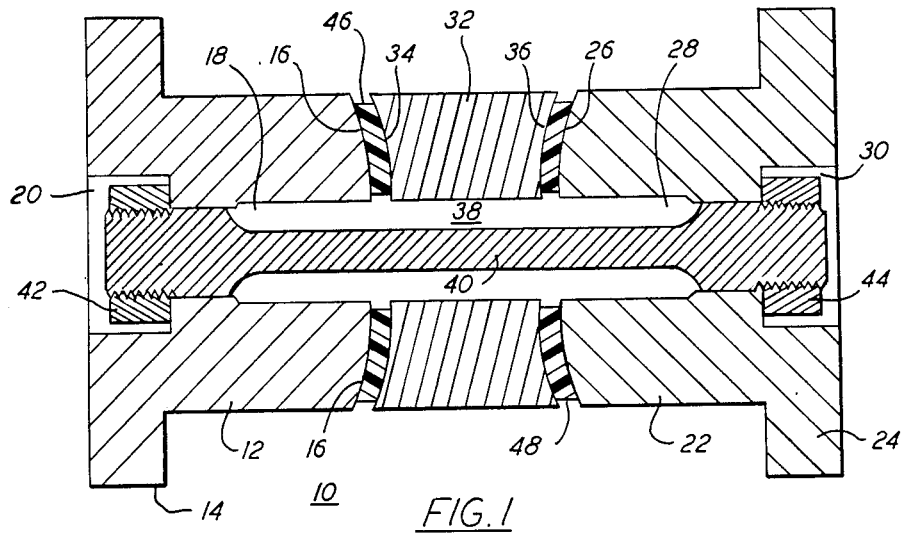
FIG. 1 is a longitudinal section of a coupling for vibration testing according to one embodiment of this invention.

With reference to the drawing, and initially to FIG. 1 thereof, a vibration testing coupling 10 is constructed so as to have all of the desirable characteristics mentioned previously. In this coupling 10 a connecting link 12 is attached to a shaker head (not shown) by means of a connecting flange 14 at its proximal end. The link 12 also has a domed or convex spherical bearing surface 16 at its distal end, and has an axial through-passage 18. There is a central recess 20 on the proximal or flange side of the link 12. A second connecting link 22 is attached to a driven element, such as the test fixture, by means of a connecting flange 24 at its proximal end. This link 22 has a spherical convex bearing surface 26 and a through-passage 28, similar to that of the first link 12. There is a central recess 30 on the proximal end of the connecting link 22. In this embodiment, the links 12 and 22 are substantially identical, and have their proximal bearing surfaces 16 and 26 facing one another.

A central element 32 has opposed concave spherical bearing surfaces 34 and 36, which face against the convex bearing surfaces 16 and 26, respectively. The element 32 is of circular cross section, and has a central axial passage 38 aligned with the passages 18 and 28. A preloading bolt 40 extends through the through passages from the proximal end of the link 12 to the proximal end of the link 22, and is supported against them by preload nuts 42 and 44 in the respective recesses 20 and 30. A layer of a low friction fabric material 46 (i.e. a fiber-reinforced Teflon or PTFE) is situated between the bearing surfaces 16 and 34, and a similar layer of material 48 is disposed between the bearing surfaces 26 and 36.

The flange or flanges 14 and 24 of the connecting links 12 and 22 may have clearance holes around them to permit bolting to the shaker head and to the driven fixture. The spherical bearing surfaces 16 and 26 are curve-machined so that they will seat precisely against the mating center element 32. While these surfaces 16 and 26 must be precision machined, they do not require the precise lapped surface necessary for a hydrostatic bearing. In fact, it is preferred that the surface 16 and 26 be etched such that the Teflon-fiber layers 46 and 48 may be applied onto them using an epoxy or another suitable adhesive. Each of the elements 12, 22, and 32 should be machined from a single solid piece of metal to ensure stiff action.

The center element 32 has its concave surfaces 34 and 36 machined to substantially the same radius of curvature as the corresponding surfaces 16 and 26. These surfaces 34, 36 are wear surfaces that rub against the Teflon-fiber layers 46 and 48. Therefore, they should be hardened and polished to a fine finish (8 to 16 microinches). In the case of aluminum construction, the surfaces 34 and 36 can be hardened by anodizing.

The preloading bolt 40 eliminates or minimizes backlash. The bolt 40 preloads the connecting links 12 and 22 against the center element 32 with a force that significantly exceeds the highest expected vibration force. The design preload level is such that separation of the connecting links 12, 22 and center element 32 will not occur during a normal operation. That is, properly preloaded, the coupling 10 of FIG. 1 has stiffness that is nearly equal to that of a rigid coupling of the same cross section. Moreover, the bolt 40 is of extremely high tensile strength and is capable of withstanding stresses that significantly exceed the preload stresses that are actually employed.

As the connecting links 12 and 22 must be able to assume various angular and translational orientations relative to each other during an actual vibration test, the preloading bolt 40 must be able to withstand stresses other than the preloading tension across it. The preloading bolt should be designed to accommodate both bending and torsion.

The Teflon-fiber material in the low-friction layers 46 and 48 have a superior coefficient of friction characteristic, typically 0.02 or lower, which renders it suitable for most or all applications. The fiber-reinforced PTFE in the layers 46 and 48 will withstand stresses much higher than PTFE alone, and will also resist cold flowing. The layers 46 and 48 can be made quite thin, typically with a cross section 0.020 inches or less. This renders the assembly extremely stiff, approaching the stiffness of the standard hydrostatic bearing.

The material for the layers 46 and 48 can be applied to the respective surfaces 16 and 26, using a high strength adhesive, and cured under heat and pressure using the mating center element 32 as a mold or mandrel.

Figure 2:
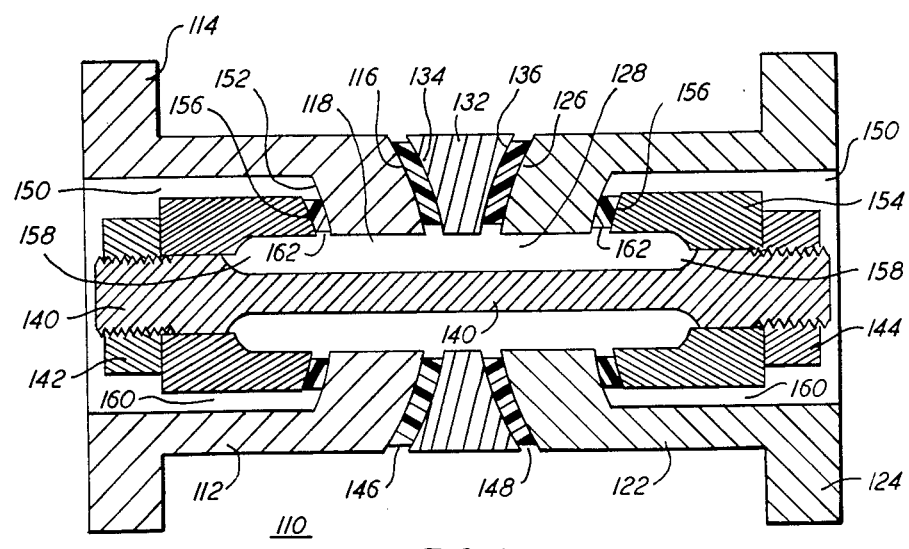
FIG. 2 is a longitudinal section of a coupling for vibration testing according to another embodiment of this invention.

An alternative configuration of the coupling of this invention is shown in FIG. 2, in which similar elements are identified with the same reference number, but raised by 100. To the extent that the elements thereof are the same as those in FIG. 1, a detailed description can be omitted.

In this vibrational test coupling 110, each of the connecting links 112 and 122 is of a two-part construction, with the main or outer portion of the link 112, 122 having a central, generally cylindrical recess 150. Each recess has a concave spherical bearing surface 152 towards its distal end, i.e. towards the center element 132. For each link outer portion there is an inner portion 154 which is of generally cylindrical shape. Each inner portion 154 has a distal spherical convex bearing surface 156, and a central through passage 158. The recess 150 is of sufficient larger diameter than the inner portion 154 to provide a significant annular clearance 160 therebetween. A layer of low-friction material 162, i.e. fiber-reinforced PTFE, is applied with epoxy or adhesive to the surface 156, to provide a low-friction layer to slide against the spherical surface 152.

Similar low friction layers 146 and 148 are situated between the spherical bearing surfaces 116 and 134 and between the bearing surfaces 126 and 136, as in the first embodiment. The preload bolt 140 is held in tension against the proximal surfaces of the connecting link inner portions 154 by respective preload nuts 142 and 144.

In the embodiment of FIG. 2, the vibration testing coupling 110 has enhanced capability for accommodating angular misalignment. Here, the connecting links 112 and 122 can pivot more freely, as the preload force on the preloading bolt 140 does not increase with angular deflection.

Although not specifically illustrated, the vibration testing coupling devices of this invention could have one of the connecting links of one-piece construction as in FIG. 1, with the other being of two-piece construction as in FIG. 2.

While the invention has been described with reference to certain preferred embodiments, it should be understood that the invention is not limited to those precise embodiments, but that many modifications and variations thereof would present themselves to those of skill in the art without departure from the scope and spirit of this invention, as defined in the appended claims.

What is claimed is:

1. A coupling for vibration testing comprising a first connecting link to be attached to a shaking device and having an axial passage therethrough and a convex spherical distal bearing surface; a second connecting link to be attached to a driven device and having an axial passage therethrough and a convex spherical distal bearing surface, said distal bearing surfaces being oriented towards one another; a center element having an axial passage therethrough and having opposite concave spherical bearing surfaces that face against the convex spherical bearing surfaces of the first and second connecting links, respectively; low friction means disposed between each of the convex spherical bearing surfaces and the associated bearing surfaces of the center element to permit relative sliding; and a preload bolt extending within said axial passages and exerting a compressive axial preloading stress on said connecting links and said center element.

2. The coupling for vibration testing according to claim 1 wherein said preload bolt is supported directly on said first and second connecting links.

3. The coupling for vibration testing according to claim 1 wherein at least one of said first and second connecting links comprises an outer portion that includes means to connect to the associated shaking or driven device, said convex spherical bearing surface and a central recess having a concave distal spherical bearing surface with said axial passage extending through a central part of said bearing surfaces; and an inner portion disposed within said recess and having an axial passage therethrough for said preloading bolt and a convex spherical distal bearing surface to mate with the concave bearing surface in said recess of the outer portion; said preload bolt being supported against a proximal part of said inner portion; and low friction means disposed between the convex spherical bearing surface of the inner portion and the concave spherical bearing surface of the outer portion to permit relative sliding.

4. The coupling for vibration testing according to claim 3 wherein said outer portion recess is generally cylindrical with a predetermined diameter and said inner portion is generally cylindrical with a smaller predetermined diameter to define a substantial annual clearance.

5. The coupling for vibration testing according to claim 1 wherein said low friction means includes a layer of a low friction material having high shear strength.

6. The coupling for vibration testing according to claim 5 wherein said layer of low friction material comprises a fiber-reinforced low-friction polymer.

7. The coupling for vibration testing according to claim 6 wherein said low friction polymer is polytetrafluorethylene.

* * * * *